United States Patent [19]
Ammann

[11] Patent Number: 5,343,744
[45] Date of Patent: Sep. 6, 1994

[54] ULTRASONIC ANEMOMETER

[75] Inventor: Stephen K. Ammann, Cupertino, Calif.

[73] Assignee: TSI Incorporated, St. Paul, Minn.

[21] Appl. No.: 846,870

[22] Filed: Mar. 6, 1992

[51] Int. Cl.$^5$ ............................................. G01W 1/00
[52] U.S. Cl. ................................ 73/170.13; 73/170.11
[58] Field of Search ........... 73/170.13, 861.25, 861.27, 73/861.29, 861.28

[56]  References Cited
       U.S. PATENT DOCUMENTS

| | | | |
|---|---|---|---|
| 3,633,415 | 1/1972 | Luce | 73/861.27 |
| 3,641,817 | 2/1972 | Dory. | |
| 3,727,454 | 4/1973 | Courty | 73/861.28 |
| 4,003,256 | 1/1977 | Donelan et al.. | |
| 4,031,756 | 6/1977 | Rotier et al. | 73/861.27 |
| 4,038,870 | 8/1977 | Rotier et al. | 73/170.13 |
| 4,112,756 | 9/1978 | MacLennan et al.. | |
| 4,174,630 | 11/1979 | Nicoli. | |
| 4,262,545 | 4/1981 | Lamarche et al.. | |
| 4,334,431 | 6/1982 | Kohno et al. | 73/861.27 |
| 4,576,047 | 3/1986 | Lauer et al.. | |
| 4,787,252 | 11/1988 | Jacobson et al.. | |
| 4,882,931 | 11/1989 | Breeuwer. | |
| 4,890,488 | 1/1990 | Pincent et al.. | |
| 5,123,286 | 6/1992 | Baumgartner | 73/861.27 |

Primary Examiner—Richard E. Chilcot, Jr.
Assistant Examiner—R. Biegel

[57]  ABSTRACT

An ultrasonic anemometer employs three ultrasonic transducers arranged in a configuration defining a horizontal equilateral triangle. Each of the transducers has a response profile characterized by a primary central lobe and secondary or side lobes angularly inclined from and surrounding the primary lobe. Each transducer is tilted from the horizontal to align the secondary lobes with signal propagation paths between it and the other transducers, thus affording a minimum number of transducers performing at a high degree of efficiency. Circuitry is employed to cause the ultrasonic transducers to generate either continuous wave acoustic signals or single pulse acoustic signals on an alternating basis. In each case only one of the transducers transmits the acoustic signal while the other two transducers receive the signal. Propagation measurements based upon the continuous wave and the single pulse are combined to provide a composite propagation time, for each of two opposite directions in connection with each propagation path. These values in turn are combined to obtain a single vector representation of wind speed and direction.

18 Claims, 8 Drawing Sheets

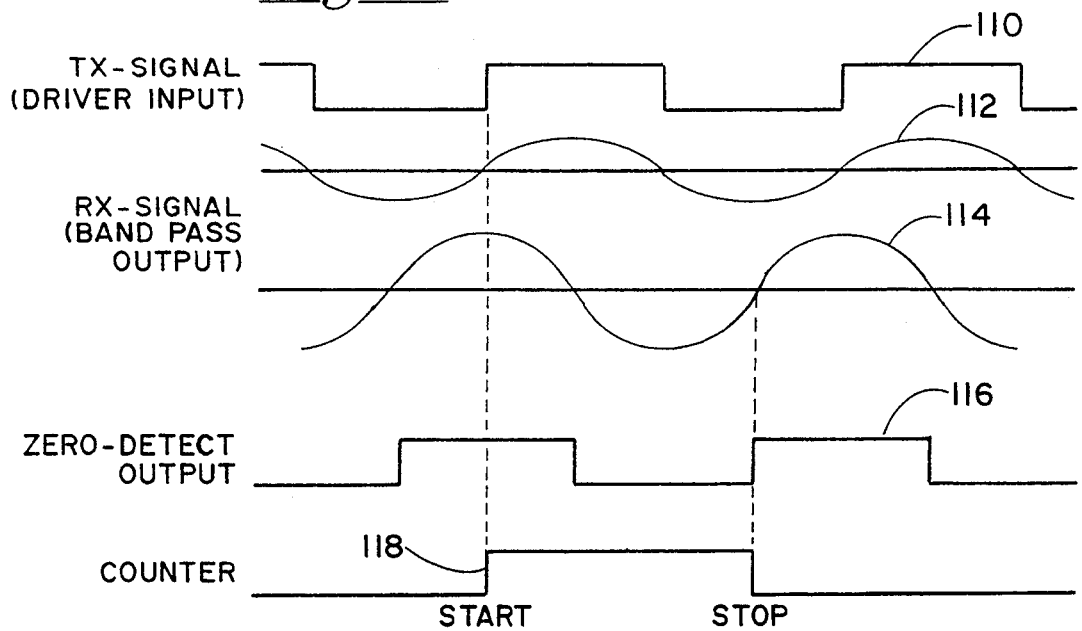
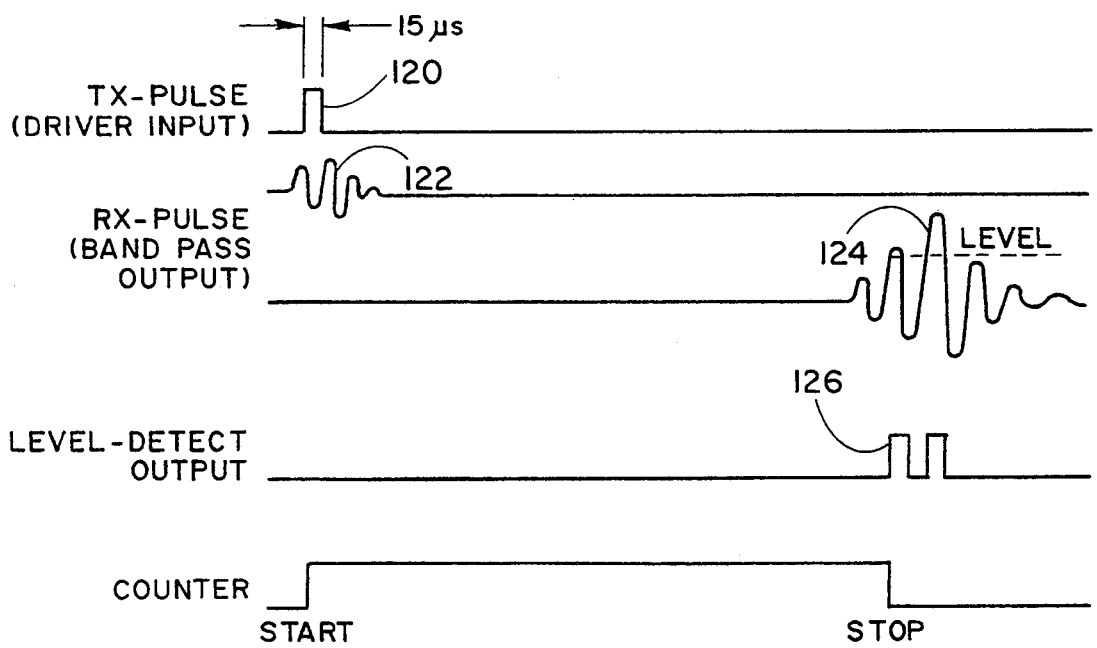

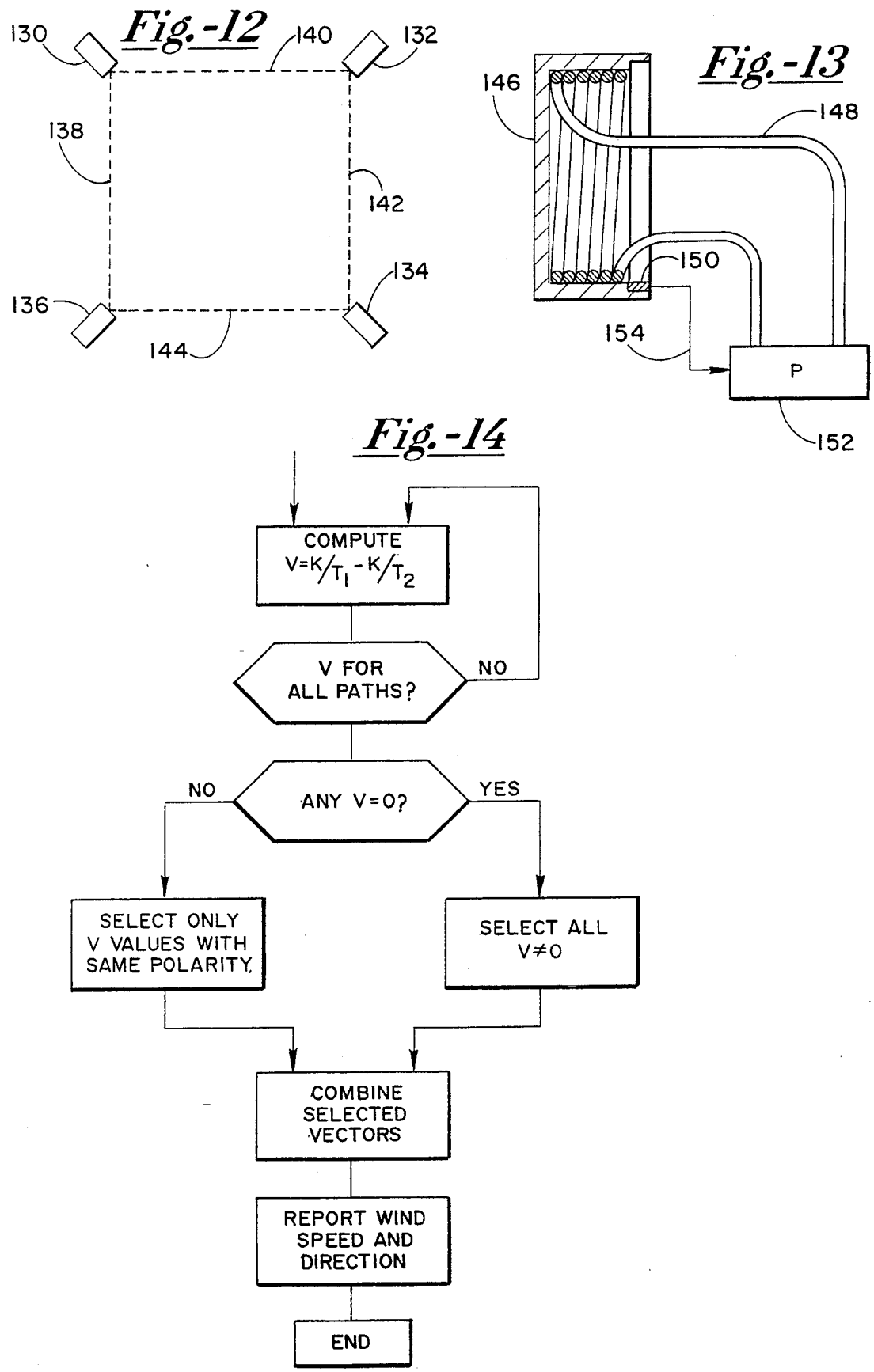

ULTRASONIC ANEMOMETER

BACKGROUND OF THE INVENTION

The present invention relates to fluid flow characterizing devices, and more particularly to systems employing ultrasonic transducers to measure wind velocity and direction.

Ultrasonic anemometers are known to have advantages over conventional mechanical anemometers employing vanes and propellers or cups. Ultrasonic anemometers have no moving parts, and avoid the substantial maintenance and repair costs associated with mechanical anemometers, particularly for devices located in remote or relatively inaccessible locations. Ultrasonic anemometers have a longer useful life and respond more rapidly to changing wind conditions as compared to mechanical anemometers. In freezing rain or other severe weather conditions, an ultrasonic anemometer detects the absence of a received signal and reports that the signal is unavailable. Ultrasonic anemometers are easier to de-ice. By contrast, the mechanical anemometer tends to freeze or jam, and report a wind velocity of zero. Frost can alter readings by influencing the coefficients of static and dynamic friction in the mechanical anemometer.

Generally, the ultrasonic anemometer employs two or more ultrasonic transducers for generating and receiving ultrasonic signals. Signal propagation times along linear paths between transducers are determined and used to calculate wind speed and direction.

A primary disadvantage of a ultrasonic anemometers, as compared to mechanical anemometers, is their expense. The ultrasonic probes or transducers themselves are costly, and further expense arises due to the need for complex electrical signal processing circuitry. The electrical signals that cause the transducers to generate acoustic signals are generally either continuous wave signals or individual pulses. The continuous wave, typically sinusoidal, allows measurement based on phase shift. This permits accurate measurement, as phase shift can be determined by detecting zero crossings of the signal. This approach has limited utility, however, in that the phase angle "wraps" or repeats itself every cycle or every 360 degrees. Accordingly, measurement circuitry can not differentiate between two air flows, one of which causes a 360 degree greater phase shift as compared to the other. An example employing continuous wave ultrasonic energy is disclosed in U.S. Pat. No. 4,003,256 (Donelan et al). In the Donelan patent, free running acoustic oscillators propagate acoustic energy either along non-parallel paths or along single, periodically reversing path. Each oscillator is in a circuit that also includes acoustic transducers that determine the frequency of the circuit.

The pulsed time delay (individual pulse) approach has no inherent range limitation. However, the accuracy of this approach is relatively poor compared to the continuous wave approach, largely due to uncertainties in detecting thresholds as opposed to the unambiguous zero crossing measurements in the continuous wave approach. The shape of the acoustic pulse influences the time instant at which the pulse is detected, introducing significant error into propagation time measurements. U.S. Pat. No. 4,112,756 (MacLennan et al) discloses an ultrasonic air flow measuring system employing individual pulses and a counter for determining pulse propagation times between two spaced apart transducers.

A known approach to enhancing the accuracy of measurements based on pulse time delay is to digitize the received signal and then employ digital correlation. This requires additional costly circuits such as fast high resolution analog-to-digital converting circuits and random access memory (RAM) to store the data before it is processed.

Another disadvantage of ultrasonic anemometers arises when one of the linear signal propagation paths is parallel or nearly parallel to the wind direction. Such alignment causes turbulence along the signal path, causing significant random variations in signal transit times and signal amplitudes. The upwind transducer causes a wind shadow that coincides with the signal propagation path, resulting in further error.

Therefore, it is an object of the present invention to provide an ultrasonic anemometer with relatively straight-forward and inexpensive signal processing circuitry yet capable of obtaining accurate wind velocity and direction measurements.

Another object is to provide a process for determining ultrasonic energy propagation times based on a combination of continuous wave forms and individual pulse wave forms.

A further object is to provide an ultrasonic anemometer in which an array of ultrasonic transducers is configured for maximum effectiveness while using a minimum number of transducers.

Yet another object is to provide, in a device employing ultrasonic transducers to measure the velocity and direction of a fluid flow, a means for selectively ignoring signal propagation information along one of the linear propagation paths, when the selected path is at least substantially parallel to the direction of fluid flow.

SUMMARY OF THE INVENTION

To achieve these and other objects, there is provided an ultrasonic anemometer. The anemometer includes at least three electroacoustic transducing means mounted in spaced apart relation to one another, to define a plurality of linear acoustic signal propagation paths between adjacent pairs of the transducing means. Together, the propagation paths form a polygon with each of the transducing means at an apex of the polygon and associated with an adjacent pair of the propagation paths. Each one of the transducing means sends and receives acoustic signals along its associated pair of the propagation paths. Each transducing means has a directional response characterized by a primary lobe disposed on a primary axis, and a secondary lobe. The secondary lobe is also centered on the primary axis, and is inclined at a lobe angle relative to the primary axis. The secondary lobe surrounds the primary lobe in a conical configuration that diverges in the direction away from the transducing means. Each transducing means further is disposed with its primary axis offset from its associated pair of propagation paths, by a selected angle related to the lobe angle. This positions the secondary lobe in substantial alignment with the associated pair of linear paths.

Preferably the polygon is an equilateral triangle, whereby each apex angle is 60 degrees. The preferred transducing means is a transducer having a lobe angle of approximately 50 degrees. Accordingly, the primary axis of each transducer is inclined from the plane of the equilateral triangle by an angle of about 45 degrees. As a result, the secondary lobe of each transducer envelops both associated propagation paths, thus to substantially enhance efficiency in transmitting and receiving ultrasonic or other acoustic signals.

Another aspect of the present invention is a signal processing apparatus for fluid velocity measuring system. The apparatus includes a plurality of electroacoustic transducing means mounted in spaced apart relation to one another within a fluid flow. The transducing means cooperate to define a set of linear bidirectional acoustic signal propagation paths. The set is comprised of one such propagation path between each pair of transducing means. A first signal generating means generates a first electrical signal in the form of a continuous wave, and a second signal generating means generates a second electrical signal in the form of an individual pulse. A coupling means selectively electrically couples the signal generating means and the transducing means, to cause the transducing means to generate a continuous wave acoustic signal in response to receiving the first electrical signal and, alternatively, to generate an acoustic pulse in response to receiving the second electrical signal. Each of the transducing means, in response to receiving the acoustic continuous wave signal and the acoustic pulse signal, generates (respectively) a third electrical signal in the form of a continuous wave and a fourth electrical signal in the form of an individual pulse. A detecting means is coupled to the transducing means and to the pulse generating means, for sensing the first, second, third and fourth electrical signals. A counting means, coupled to the detecting means, generates a plurality of values with respect to each of the paths, including first and second values representing acoustic continuous wave signal propagation times along the path in first and second opposite directions, and third and fourth values that represent propagation times of the individual pulse in the first and second directions. A computing means is coupled to the counting means for calculating, with respect to each linear path, a signal propagation time in the first direction based upon the first and third values, and a propagation time in the second direction based upon the second and fourth values.

The preferred first signal generating means is a continuous wave generator, and the second signal generating means is a pulse generator. Multiplexers are coupled between the pulse generator means and transducing means for selectively providing either the continuous wave or the pulse to a selected transducer. A further multiplexer connects the outputs of the non-selected, receiving transducers to the detecting means. The computing means can include sequencers that rapidly pace the multiplexers through switching positions, whereby each transducer in turn becomes the source of acoustic signals to be received by the remaining transducers.

Another feature of the invention is a process for determining ultrasonic signal propagation times in both directions along each path, in particular by alternatively causing selected transducers to generate both a continuous wave and the pulse. Propagation times and differentials are determined, based on pulse time delay and the continuous wave. Then, the time differentials based on the continuous wave and the pulse are combined in calculating a pair of propagation times associated with each path, one time corresponding to each direction.

The result is a substantially improved determination of propagation times, incorporating the greater accuracy of continuous wave measurements and the enhanced range afforded by pulse time delay measurements, for improved measuring of wind velocity and direction. Thus, in accordance with the present invention an ultrasonic anemometer utilizes a unique configuration of ultrasonic transducers in combination with circuitry that affords the combined benefits of continuous wave and pulse time delay signal propagation.

IN THE DRAWINGS

For a further understanding for the above and other features and advantages, reference is made to the following detailed description and to the drawings, in which:

FIG. 6 is a timing diagram for the anemometer in connection with a continuous wave;

FIG. 7 is a timing diagram for the ultrasonic anemometer in connection with an individual pulse;

FIG. 12 illustrates an alternative configuration of the ultrasonic transducers in an ultrasonic anemometer.

FIG. 13 is a side sectional view of one of the ultrasonic transducers of the transducer array;

FIG. 14 is a flow chart further illustrating the operation of the anemometer;

DETAILED DESCRIPTION OF THE PREFERRED EMBODIMENTS

Figure 1:
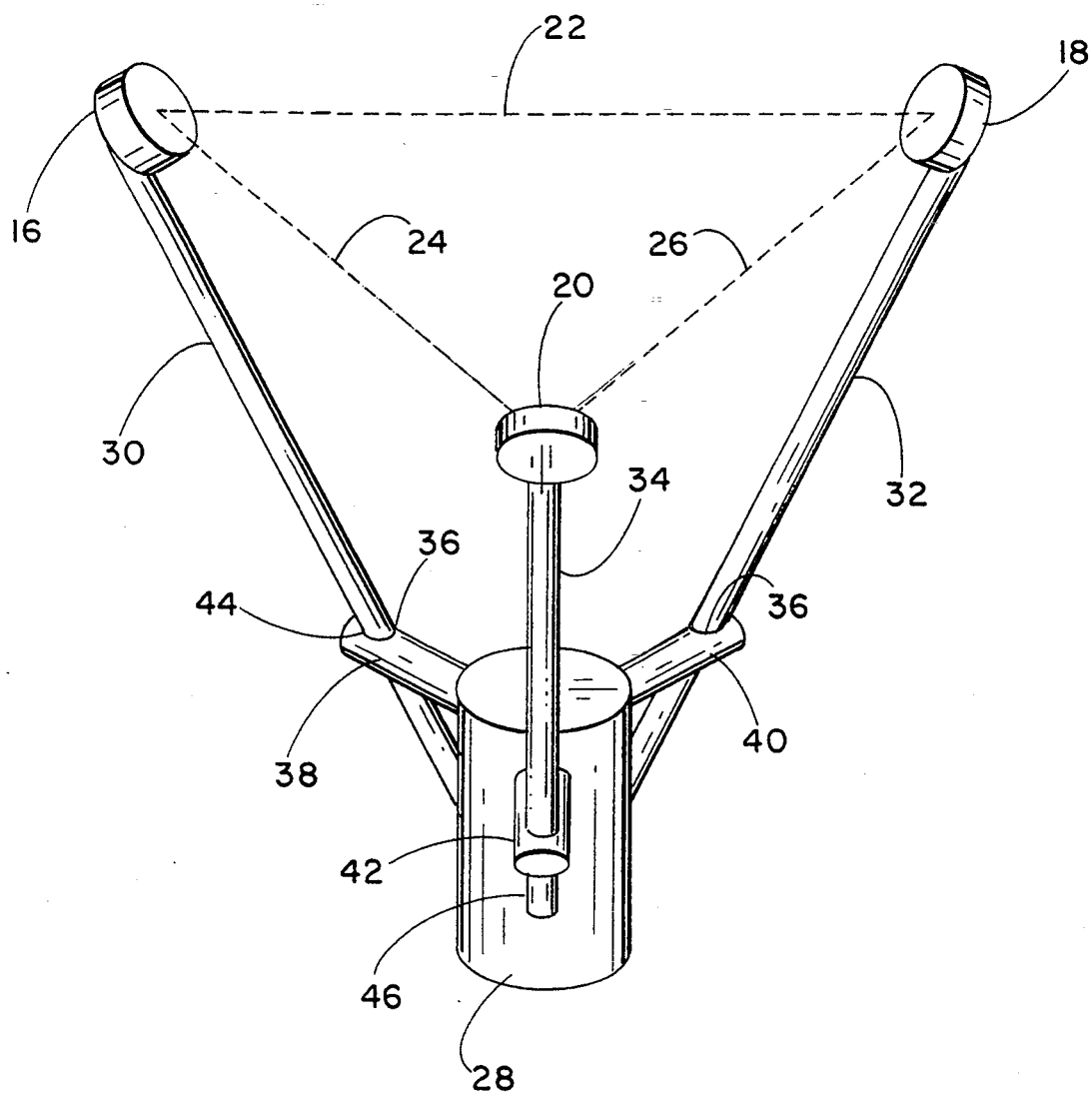
FIG. 1 is a prospective view of an ultrasonic transducer array, configured as part of an ultrasonic anemometer in accordance with the present invention.

Turning now to the drawings, there is shown in FIG. 1 an ultrasonic transducing array including three ultrasonic transducers 16, 18 and 20 spaced apart from one another to define three acoustic signal propagation paths indicated in broken lines at 22, 24 and 26. Each propagation path is associated with an adjacent pair of the transducers, and is bidirectional in the sense that (for example) acoustic signals travel from transducer 16 to transducer 18, and from transducer 18 to transducer 16, along path 22. In turn, each of transducers 16, 18 and 20 is associated with its adjacent propagation paths. Transducer 16 is associated with propagation paths 22 and 24 for interaction with transducers 18 and 20, respectively. Propagation paths 22, 24 and 26 form the sides of an equilateral triangle in a horizontal plane, with each of transducers 16, 18 and 20 at an apex of the triangle.

Structure supporting the transducers includes an aluminum base 28 and three aluminum support arms 38, 40 and 42 secured to the base. An opening 36 is formed through each of the arms near its free end. The respective openings accommodate epoxy fiberglass tubes 30, 32 and 34, each supporting one of the ultrasonic transducers at its free end. Silicone adhesive secures each tube to the aluminum base as indicated at 44, and further is used to secure each tube within its respective support arm opening, as indicated at 46. The silicone adhesive dampens any acoustical impulses transmitted through the transducer support, to minimize the risk of extraneous signals influencing ultrasonic signal propagation measurements.

Figure 2:
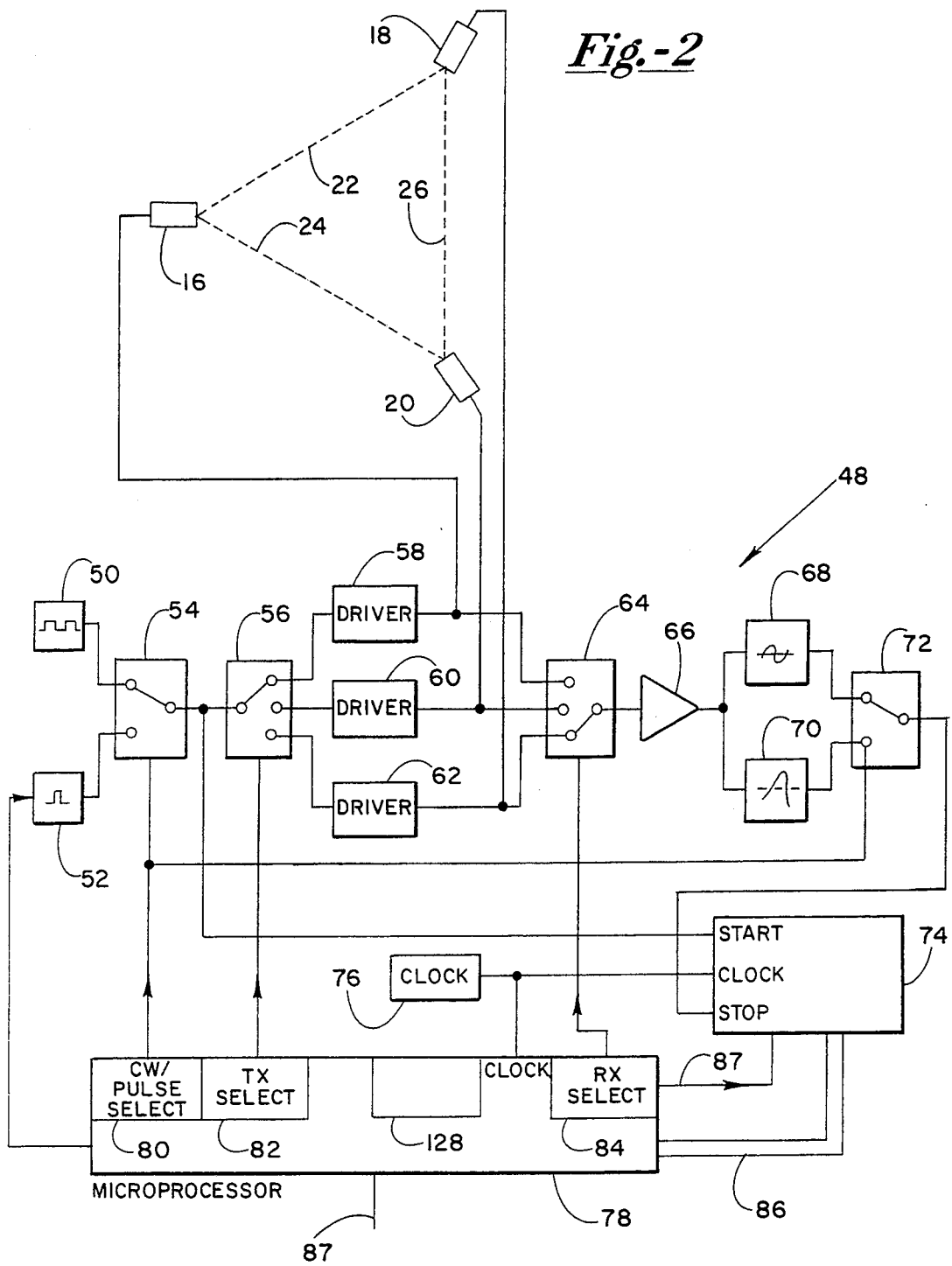
FIG. 2 is a diagrammatic view of the ultrasonic anemometer including the transducer array and accompanying circuitry.

As seen in FIG. 2, the transducers are part of an ultrasonic anemometer that includes electrical circuitry, indicated generally at 48. The electrical circuitry is provided for (1) selectively causing each one of transducers 16, 18 and 20 to generate ultrasonic signals; (2) sensing ultrasonic signals received by the transducers based on electrical signals generated by each transducer in response to receiving the ultrasonic signals; (3) determining propagation times of the ultrasonic signals along paths 22, 24 and 26; and (4) determining wind speed and direction, based on the propagation times.

Circuit 48 includes a continuous wave generator 50 and a pulse generator 52 that generates a single pulse approximately every two milliseconds. Both generators are coupled to a mode select multiplexer 54. The output of the mode select multiplexer is provided to a transmitter select multiplexer 56 with three alternative outputs, one to a driver circuit 58 coupled to transducer 16, one to a driver 60 associated with transducer 20, and one to a driver 62 associated with transducer 18. The output of each driver is either an analog pulse or a continuous wave analog signal, e.g. a sinusoidal signal that repeats each cycle (i.e. every 360 degrees). The output of each driver is provided to its associated ultrasonic transducer, to excite the crystal in the associated transducer and thus cause the associated transducer to generate ultrasonic signals.

At any given instant, only one of ultrasonic transducers 16, 18 and 20 generates an ultrasonic signal. The remaining transducers receive the signal, each in turn generating an analog electrical signal in response.

The analog electrical signals generated by the transducers are provided to a receiving multiplexer 64, which can be switched selectively to receive, exclusively, the analog electrical signal of each one of the transducers. The output of multiplexer 64, i.e. the analog electrical signal of the selected transducer, is provided to a bandpass amplifier 66. The filtered analog signal then is provided to detection circuitry including a zero crossing detection circuit 68 and a pulse threshold detection circuit 70 for detecting pulses having at least a non-zero threshold amplitude. Each of circuits 68 and 70 generates a digital output provided to a detection mode select multiplexer 72. Multiplexer 72 is operated in concert with mode select multiplexer 54, to insure that the digital output of multiplexer 72 is based on zero crossing detection when the ultrasonic signals are based on the continuous wave output of generator 50, and on threshold level detection when the ultrasonic signals are based on the individual pulse output of pulse generator 52.

The output of multiplexer 72 is provided to a "stop" input of a digital counter 74. Other inputs to counter 74 include a "start" input coupled to the output of mode select multiplexer 54, and a clock input coupled to receive clocking pulses generated by a clock oscillator 76. Clock oscillator 76 generates pulses with a frequency in the range of 3–4 megahertz, which affords sufficient accuracy to detect wind speeds of about 0.2 mile per hour.

Oscillator 76 further provides the clocking signal to a clock input of a microprocessor 78. Microprocessor 78 generates three system-controlling outputs including a mode select signal to multiplexers 54 and 72; a transmitter-select control signal to multiplexer 56; and a receiver-select control signal to multiplexer 64. Microprocessor 78 also controls pulse generator 52.

A sequencer 80 in the microprocessor controls the switching of multiplexers 54 and 72 to alternative positions with respect to the continuous wave and individual pulse, respectively. Sequencers 82 and 84 respectively control multiplexers 56 and 64, and are coordinated with one another in the sense that during the selective coupling of one of the ultrasonic transducers as the transmitter, sequencer 84 switches receiving multiplexer 64 between the remaining, receiving transducers. For example, with transducer 16 coupled as the transmitter, only transducers 18 and 20 are coupled, alternatively, as receivers.

Counter 74 provides information to microprocessor 78 over a data bus 86 and a control bus 87. The information includes accumulative counts based on ultrasonic signal propagation times. The microprocessor includes arithmatic logic circuitry for calculating composite propagation times based on combined continuous wave and individual pulse information. Further circuitry in the microprocessor is employed to determine wind speed and direction, based on composite propagation times in both directions along each of propagation paths 22, 24 and 26. Wind speed and direction information is provided via a serial output 89 to an airport system, weather monitoring station, etc.

Figure 3:
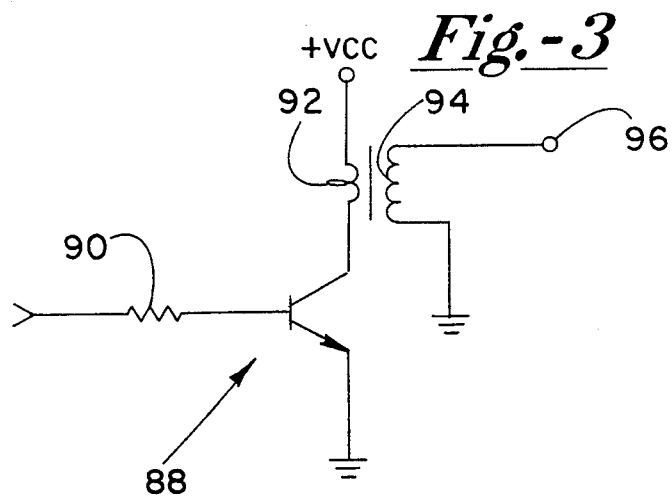
FIG. 3 is a more detailed view of a portion of the circuitry in FIG. 2.

Each of drivers 58, 60 and 62, when coupled to receive the signal from multiplexer 56, provides an analog electrical signal to its associated ultrasonic transducer. As seen in FIG. 3, driver 58 includes an npn transistor 88 receiving the multiplexer signal at its base terminal through a resistance 90. The emitter of transistor 88 is connected to ground, while the collector terminal is coupled to positive voltage through a coil 92 of a transformer. The other coil 94 of the transformer is coupled to ground at one end, with the other end of the coil providing the desired analog signal at a driver output terminal 96. The other drivers are substantially the same.

Figure 4:
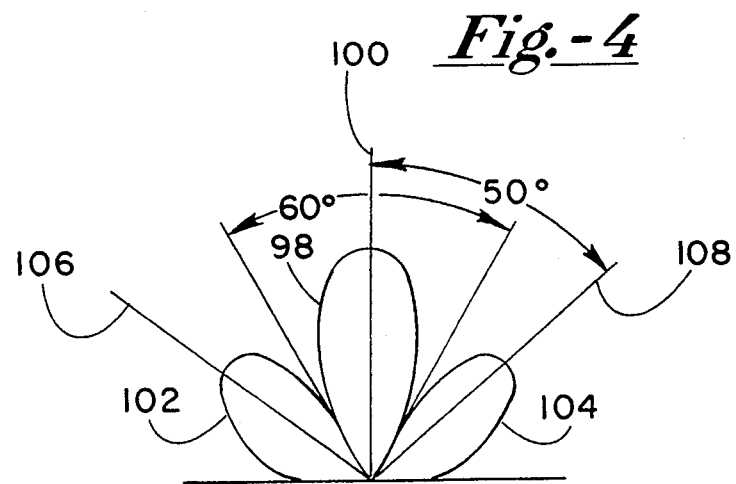
FIG. 4 is a schematic view showing a response profile of one of the ultrasonic transducers, taken on a plane bisecting the transducer.

One of the features of the present invention is an ultrasonic transducer configuration that permits the use of ultrasonic transducers with directional response characteristics. FIG. 4 illustrates transducer 16 and its response profile, it being understood that the remaining transducers have substantially the same characteristic response. The profile includes a primary lobe 98, surrounding and centered on a primary or central axis 100 of the transducer. A secondary response appears in profile as secondary lobes 102 and 104, each centered on a secondary axis as shown at 106 and 108, respectively. Each secondary axis is inclined at an angle of about 50 degrees with respect to the primary axis. It is to be understood that if represented in three dimensions, the secondary lobes would form a cone surrounding the primary lobe and centered on the primary axis, with the cone diverging in the direction away from the transducer.

Figure 5:
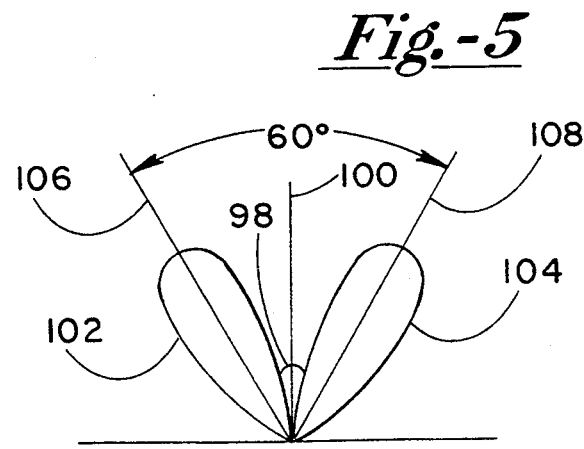
FIG. 5 is another profile showing the directional response of the transducer, taken on a plane inclined with respect to the plane in FIG. 4.

FIG. 5 shows another response profile for transducer 16, again showing primary lobe 98 and secondary or side lobes 102 and 104. The plane of this profile, unlike that in FIG. 4, does not include the primary axis. Rather, the plane is inclined from the primary axis at an angle of about 45 degrees. Primary lobe 98 appears much smaller. Respective secondary axes 106 and 108, projected onto the plane in FIG. 5, are angularly spaced apart 60 degrees, corresponding to the apex angles of the equilateral triangle formed by propagation paths 22, 24 and 26.

Returning to FIG. 1, it is seen that each of ultrasonic transducers 16, 18 and 20 is tilted upwardly from the horizontal plane containing the propagation paths. More particularly, the angle between the horizontal plane and the primary axis of each transducer is 45 degrees. As seen from FIG. 5, the 45 degree tilt angle positions the transducers such that the angular distance between the secondary lobes coincides with the 60 degree angle between the pair of propagation paths associated with each transducer. Each transducer is centrally aligned between its associated pair of paths, so that the secondary lobes are aligned with an envelop the propagation paths.

The purpose of the tilt angle is apparent from comparing FIGS. 4 and 5. From FIG. 4 it is apparent that with transducer 16 (or any of the transducers) oriented horizontally and centered between its associated propagation paths, the paths would fall between the primary and secondary lobes, for relatively poor transducer response. By contrast, tilting at a 45 degree angle employs secondary lobes 102 and 104 at or near their full potential for transmitting and receiving ultrasonic signals. Accordingly, the characteristic response of transducers 16, 18 and 20, actually enhances transmission and reception efficiency by using the secondary lobes rather than the primary lobe.

One suitable ultrasonic transducer employed in the array is available from Massa Products Corporation (Hingham, Mass.) as Model TR-89/B series, Type 31. Other transducers having different directional response profiles of course call for different angles of tilt from the horizontal.

FIG. 6 is a timing diagram illustrating use of the continuous wave output of generator 50 to obtain an acoustic signal propagation time from the transmitting ultrasonic transducer to one of the receiving transducers. FIG. 6 illustrates the electrical signals employed to determine propagation of the acoustic continuous wave signal. A continuous digital output of continuous wave generator 50 is shown at 110. This signal is provided through multiplexer 54 to the counter and the selected driver. The duration of the pulses from continuous wave generator 50 is about 15 microseconds, corresponding to 30 microseconds as the period or cycle time of the driver output signals. This cycle time is matched to the crystals of transducers 16, 18 and 20, which have resonant frequencies of 31 kilohertz (i.e. cycles or periods of about 30 microseconds). More generally, transducers with resonant frequencies in the range of 10–70 kilohertz can be readily employed. The corresponding output of the selected driver is an analog signal indicated at 112. The driver and its associated transducer form a resonant circuit due to transducer capacitance, and the selected transducer transmits an ultrasonic signal to the other transducers. The output of each receiving transducer also is an analog signal, and is shown at 114. The output of zero crossing detection circuit 68 is indicated at 116.

As seen at 118, counter 74 is initiated by a leading edge (rise) in generator output 110, and remains active until a zero crossing in signal 114 is sensed by detection circuit 68. The counter thus generates a pulse count measuring the time (or phase) difference between wave generator signal 110 and the receiving transducer signal 114.

FIG. 7 illustrates the signals employed in determining propagation times based on pulse generator 52. A single digital pulse 120 from pulse generator 52 causes the selected driver to produce an analog pulse or burst 122. The analog pulse is delayed due to propagation of the corresponding acoustic pulse from the sending transducer to the receiving transducers, as seen in the receiving transducer output signal 124. Typically there is a delay of about 700 microseconds for propagation, although the exact delay depends upon wind direction and speed. As seen at 126, the analog burst signal causes threshold level detection circuit 70 to generate one or more digital pulses. Counter 74 is actuated coincident with the generation of pulse 120 by pulse generator 52, and accumulates a count until detection circuit 70 indicates a pulse.

Complete propagation measurement involves twelve propagation measurements in connection with propagation paths 22, 24 and 26. For each path, a propagation time in both directions is determined based upon the continuous wave acoustic signal, and readings are taken in both directions in connection with the individual acoustic pulse.

As noted above, the continuous wave provides for more accurate propagation time determinations, due to the more precise detection based on zero crossing, but is limited in range due to the inability to distinguish among repeating cycles. Time delay readings based on individual pulses are not limited in range, but can not be accurately detected, due to the lack of precision in setting the threshold level and the irregular shape of the analog pulse or burst.

However, by measuring propagation times based on a continuous wave and a single pulse, and further by appropriately combining these readings, composite propagation times are obtained that are not limited in range, yet exhibit the accuracy of continuous wave results. The manner in which the continuous wave mode and signal pulse mode are combined, in connection with path 22, is now explained in connection with the flow chart in FIG. 8 and the graphs in FIGS. 9–11. It is to be understood that the identical procedure is employed in connection with the other signal propagation paths.

Initially, two continuous wave measurements ($T_{CW}-1$ and $T_{CW}-2$) are taken for path 22, one in a first direction from transducer 16 to transducer 18, and the other in a second or opposite direction along the path. A continuous wave propagation differential is computed from the difference between the propagation times. Similarly, measurements ($T_{SP}-1$ and $T_{SP}-2$) based on the single pulse are taken in both directions, and the corresponding single pulse propagation differential is computed. The continuous wave propagation times and both differentials are stored in a memory 128 of microprocessor 78.

Figure 9:
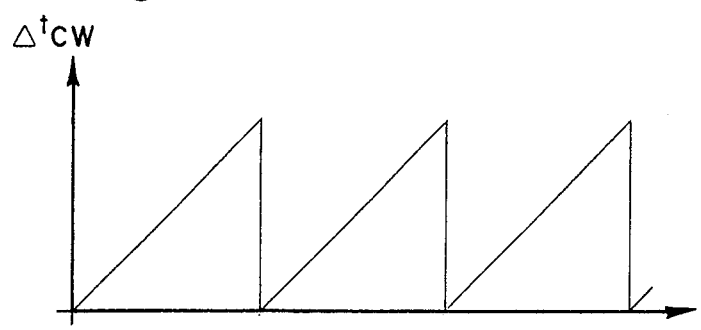
FIGS. 9, 10 and 11 are graphs illustrating continuous wave readings, pulse readings and their combination.

The graph in FIG. 9 illustrates continuous wave differential $\Delta T_{CW}$ as a function of an actual propagation differential. The sawtooth form of the function arises from the steady rate of increase in phase difference in connection with each cycle, with an abrupt return to zero phase difference at the beginning of each subsequent cycle.

Figure 10:
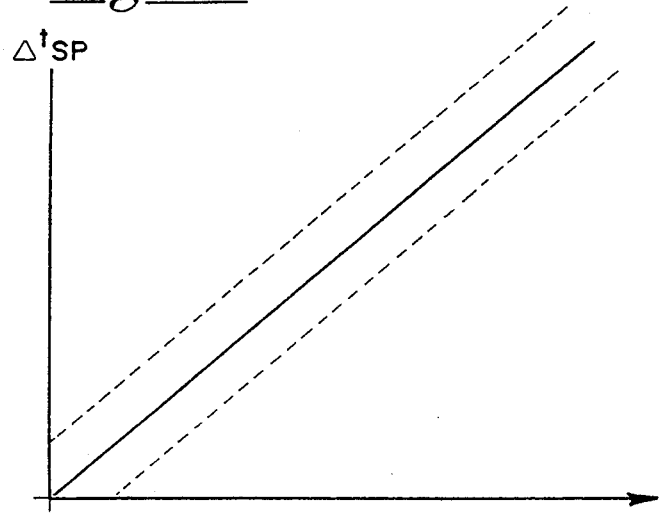

The graph in FIG. 10 illustrates the single pulse propagation differential $\Delta T_{SP}$ as a function of increasing actual time differential. The theoretical straight line indicates a constant rate of increase, with broken lines on each side of the theoretical increase indicating the error inherent in threshold level detection.

Figure 11:
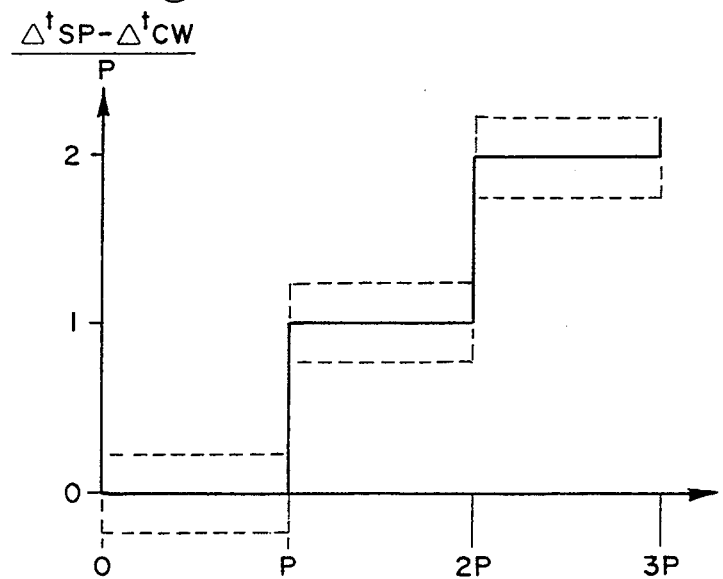

Next, a nominal value N is computed using the equation:

$$N = \frac{\Delta T_{SP} - \Delta T_{CW}}{P}$$

where $\Delta T_{SP}$ is the time differential based on the single pulse, $\Delta T_{CW}$ is the continuous wave differential, and P is the period or cycle time of the continuous wave signal. The graph in FIG. 11 shows the function:

$$\frac{\Delta T_{SP} - \Delta T_{CW}}{P}$$

as a function of time. The solid line illustrates that theoretically the function yields integers 0, 1, 2, etc. Broken lines above and below the solid lines indicate that the practical range for the function includes non-integer values. Nonetheless a high degree of accuracy is obtained, so long as the deviation from the theoretical values do not exceed one half of the period or cycle of the continuous wave function. Theoretically N is an integer, but in practice frequently is not due to measurement errors, particularly in threshold detection circuit 70. Accordingly, N is rounded to n, the nearest integer.

Next, a composite propagation time T is computed according to the equation:

$$T = nP + T_{cw}$$

More particularly, the value of T is computed for each direction along the propagation path. In the first direction, a value $T_1$ is computed using $T_{CW}-1$, while in the other direction $T_2$ is computed using $T_{CW}-2$ in the equation. The resulting propagation times have the accuracy of continuous wave measurements and the range of single pulse measurements, so long as the accuracy of the single pulse measurement is within a tolerance of half of the continuous wave cycle, i.e. 0.5 P. Thus for three propagation paths, six composite propagation times T are computed. Typically it takes approximately one second to complete the multiplexing sequences and obtain the required measurements corresponding to all propagation paths.

The composite propagation times are used to compute a velocity vector along each of paths 22, 24 and 26. In each case, a vector along the path is computed according to the equation:

$$V = K/T_1 - K/T_2$$

where K is a constant based upon the distance between transducers. It should be noted that the vector V is independent of air temperature. Finally, the three velocity vectors are combined to yield a single resultant vector. The magnitude of the resultant vector indicates wind speed, and the orientation of the resultant vector indicates wind direction.

FIG. 12 illustrates a rectangular configuration of four ultrasonic transducers 130, 132, 134 and 136, combined to define four propagation paths 138, 140, 142 and 144. These transducers can be of the same type as transducer 16 discussed above. However, since each apex angle is 90 degrees, the corresponding angle of transducer tilt necessary to align the secondary lobes with the adjacent paths is substantially less than 45 degrees. While no circuitry is illustrated in connection with the rectangular configuration, it is to be understood that in most respects the circuit components are the same, with the exception that a transmitter select multiplexer and a receiving multiplexer would have four switching positions rather than three, and the various measurements and equations discussed above would be employed in connection with four paths rather than three.

Ultrasonic anemometers are easier to de-ice than are cup and vein anemometers. Nonetheless, it is preferred to employ a means for preventing any substantial accumulation of ice and snow in transducers 16, 18 and 20, whenever the anemometer is to be employed in colder climates. To this end, FIG. 13 shows transducer 16 to include a cylindrical housing 146. An electrically insulated heating wire 148 is attached to the inside wall of housing 146 to form a coil as the heating element. Alternatively, an etched foil heating element can be attached to the inside wall. A temperature sensor 150 also is attached to the inside wall of the housing, and controls a power supply 152 through a control line 154.

In operation, when temperature sensor 150 detects temperatures sufficiently low as to be conducive to ice and snow accumulation, it provides a signal via line 154 to actuate power supply 152. The resultant current through wire 148 heats the transducer housing interior, thus to prevent ice and snow accumulation. A sufficiently elevated temperature within housing 146 causes sensor 150 to provide an appropriate signal via line 154 to interrupt current in heater wire 148 until needed once again.

As previously mentioned, an alignment or parallelism of one of the signal propagation paths with the wind direction increases the possibility of error, due to turbulence and wind shadow effects. In accordance with the present invention, this problem is overcome by selectively ignoring data from a selected one of signal propagation paths 22, 24 and 26, whenever the selected path is parallel, or at least substantially parallel, to the wind direction. Alternatively, the approach can be viewed as computing the single resultant vector, based only upon the velocity vectors V of certain selected signal propagation paths, i.e. the paths that are "reliable" by virtue of their being non-aligned with the wind direction.

Figure 8:
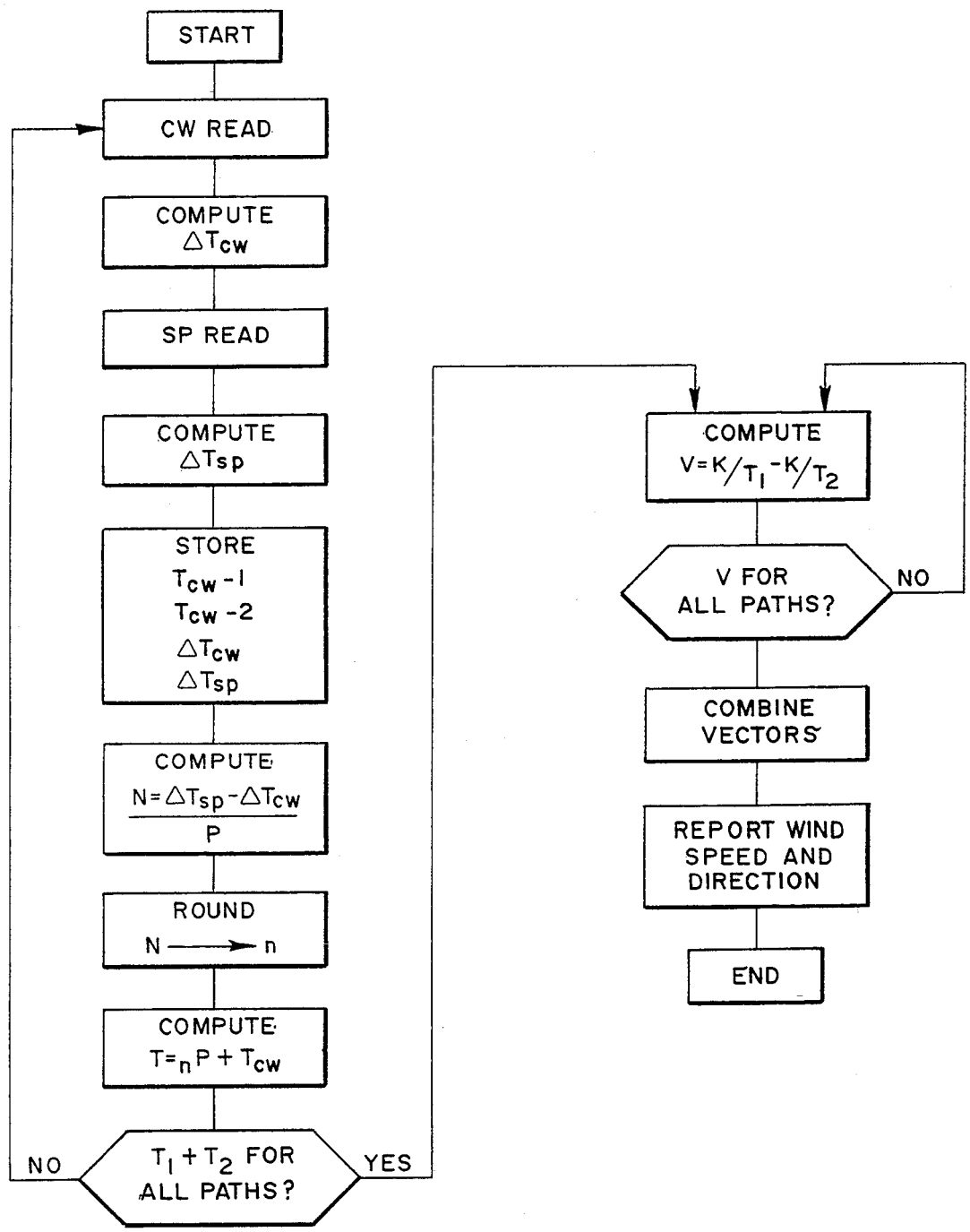
FIG. 8 is a flow chart illustrating the operation of the anemometer.

FIG. 14 illustrates a portion of the flow chart in FIG. 8, modified to selectively combine velocity vectors V in calculating the resultant vector. The approach, up to and including the computation of individual path velocity vectors, is the same as the procedure explained in connection with FIG. 8. However, once the individual path vectors V have been computed, a further determination is made as to whether any of the vectors V has a zero magnitude. As to any of propagation paths 22-26, the vector V magnitude is zero if the path is perpendicular to wind direction. It is apparent, therefore, that for any measurable wind velocity, only one of the propagation paths can have a magnitude of zero.

In the event that one of vectors V is equal to zero, the two non-zero vectors are selected and combined to yield the single resultant vector. Alternatively, all vectors could be combined to yield the same result, given that the remaining vector equals zero. In any event, the selected vectors are combined, as before, to yield a single resultant vector indicating wind speed and direction.

In the event that none of vectors V equals zero, the two vectors V having the same polarity are selected, and only the selected vectors are used to calculate the resultant vector. Vector polarity is determined such that if all three vectors V had the same magnitude, their sum would equal zero. In the equilateral triangular configuration of transducers 16, 18 and 20, this requirement is satisfied, for example, by arbitrarily assigning a positive polarity in one direction "around" the triangle (e.g. the clockwise direction is considered positive in polarity).

Figure 15:
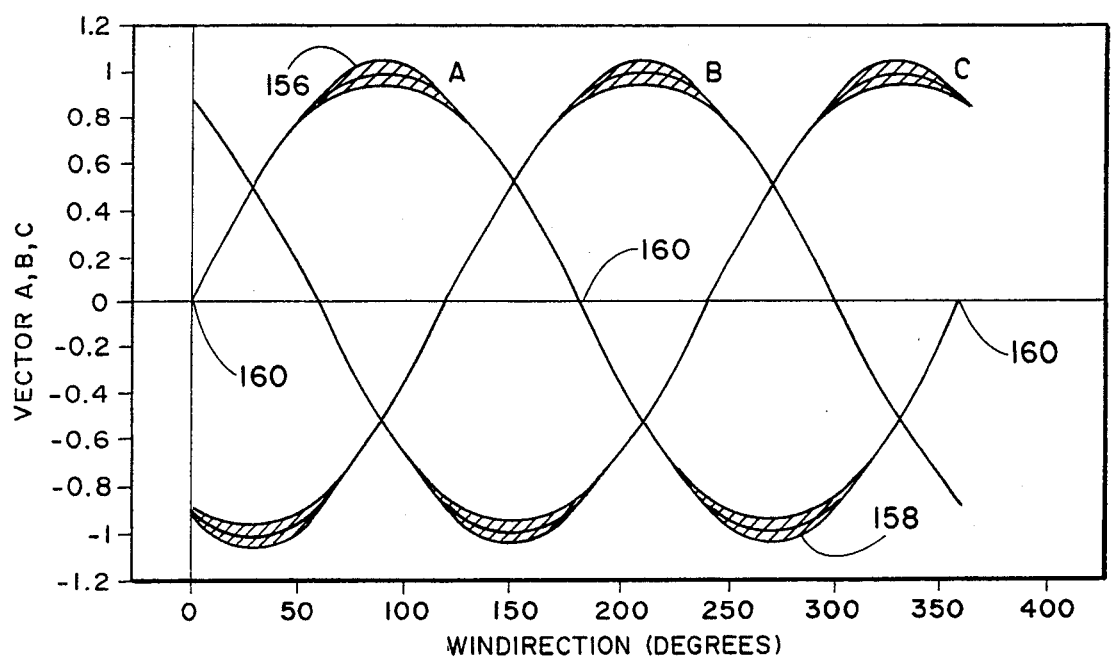
FIG. 15 is a graph illustrating the principal of anemometer operation as shown in FIG. 14.

In the equilateral triangle configuration, selection of the vector pair with the same magnitude corresponds to ignoring the vector aligned with wind direction. This feature is perhaps best understood in connection with the graph in FIG. 15. The curve labeled "A" plots the magnitude of the vector V of propagation path 22 over a complete range or cycle of angular positions relative to wind direction. For example, path 22 is parallel to the wind direction at points 156 and 158, and perpendicular to the wind direction at points 160. Point 156 is the maximum positive magnitude, and point 158 is the most negative magnitude. The hatched areas represent error that arises due to turbulence and wind shadow effects.

The curves labeled "B" and "C" similarly represent magnitudes of the vectors relating to propagation paths 24 and 26, respectively. Thus, the positive and negative peaks of each curve represent parallelism between the associated propagation path and the wind direction. Along the positive peak region of curve A, curves B and C have negative polarity. Along the negative peak region of curve A, curves B and C have positive polarity. The positive and negative peak regions of curves B and C are likewise counterbalanced by the opposite polarity in the remaining two curves. Accordingly, selection of the pair of vectors V with the same polarity automatically eliminates the vector V considered undesirable due to its alignment with wind speed. Thus, the shared polarities of two of the vectors are employed to detect a peak or near peak region in the remaining vector.

Figure 16:
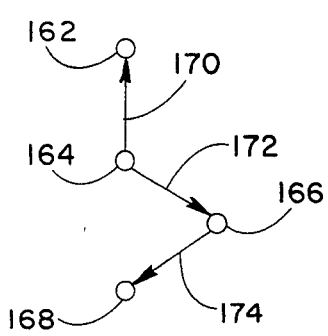
FIG. 16 is a schematic view of a further alternative configuration of ultrasonic transducers.

While an equilateral triangle configuration is preferred, it is not necessary to the selection of vector pairs of the same polarity. For example, an array of four transducers 162-168 (FIG. 16) defines three propagation paths 170, 172 and 174. The propagation paths are coplanar, each being inclined 60° relative to the other two paths. Each propagation path is bidirectional, with an arrow in each case indicating the direction of positive polarity.

Figure 17:
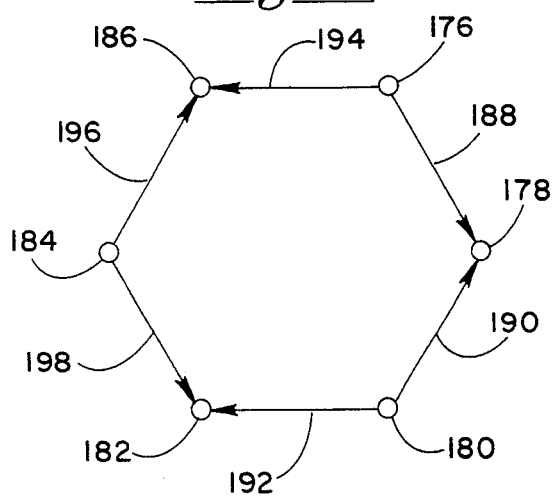
FIG. 17 is a schematic view of yet another alternative configuration of ultrasonic transducers.

Yet another array is shown in FIG. 17, including six ultrasonic transducers 176-186 defining six acoustic signal propagation paths 188-198. Again, the paths are bidirectional, with the arrows indicating the direction of positive polarity. This array provides redundancy in the form of two sets of propagation paths, one consisting of paths 188-192 and the other set consisting of paths 194-198. For each set, polarity is selected such that vectors of equal magnitude along the three paths would result in a sum of zero. Each propagation path in each set is inclined by an angle of 60° from the other two paths.

The 60° angular separation among propagation paths is highly preferred, due to the above explained manner in which shared polarity can detect a peak in the remaining curve. Nonetheless, it is to be appreciated that other configurations, such as non-equilateral triangles, can be employed in combination with alternative means for detecting peaks in the vector magnitudes, e.g. a threshold level that varies with wind velocity.

Thus, in accordance with the present invention, ultrasonic transducers with directional response characteristics are selectively inclined relative to the plane of measurement, such that their side or secondary lobes are employed in the transmission and reception of ultrasonic or other acoustic signals. The transducers are selectively caused to generate ultrasound signals exclusively and individually, and alternatively based on either a continuous wave or a single pulse. The combined continuous wave and pulse measurements enable a determination of which cycle of the continuous wave signal must be selected to most accurately reflect propagation time, in effect providing a range for the continuous wave signal well beyond one period or cycle. Data from propagation paths aligned with the wind direction can be selectively ignored in calculating resultant wind velocity and direction. Thus, highly accurate and durable ultrasonic anemometers can be installed at relatively low cost for effective monitoring of wind velocity and direction, particularly in remote, relatively inaccessible locations.

What is claimed is:

1. In a fluid flow measurement system including at least two spaced apart electroacoustic transducing means, a process for determining ultrasonic signal propagation times along a bidirectional signal propagation path between the transducing means, including the steps of:

a. (i) causing a first one of the transducing means to generate a continuous wave acoustic signal in a first direction and receiving the continuous wave acoustic signal at the second transducing means; (ii) causing the second transducing means to generate the continuous wave acoustic signal in a second direction opposite to the first direction, and receiving the continuous wave acoustic signal at the first transducing means; (iii) causing the first transducing means to generate a single pulse acoustic signal in the first direction and receiving the single pulse acoustic signal at the second transducing means; and (iv) causing the second transducing means to generate the single pulse acoustic signal in the second direction and receiving the single pulse acoustic signal at the first transducing means;

b. Determining respective signal propagation times $T_{CW}-1$ and $T_{CW}-2$ corresponding to propagation between the transmission means in the first and second directions based on respective phase comparisons of the sent and received continuous wave signal and determining a continuous wave time differential $\Delta T_{CW}$ based upon the difference in the respective propagation times;

c. Measuring respective single pulse propagation times $T_{SP}-1$ and $T_{SP}-2$ corresponding to propagation of the single pulse in the first and second directions, and determining a pulse time differential $\Delta T_{SP}$ based on the difference in the respective signal propagation times; and d. Determining a value for the propagation time based upon a combination of the values $\Delta T_{SP}$ and $\Delta T_{CW}$.

2. The process of claim 1 wherein said step (a) includes:
   generating a first electrical signal in the form of a continuous wave;
   generating a second electrical signal independent of the first electrical signal and comprising a single pulse; and
   intermittently and alternatively supplying each of the first electrical signal and the second electrical signal to each one of the first transducing means and the second transducing means.

3. The process of claim 2 wherein step (d) includes:
   (i) determining a value N according to the equation:

$$N = \frac{\Delta T_{SP} - \Delta T_{CW}}{P}$$

where P is the period of the continuous wave signal;
   (ii) rounding N to the nearest integer n; and
   (iii) determining for each of the first and second directions a composite propagation time T according to the equation:

$$T = nP + T_{CW}.$$

4. The process of claim 3 wherein the system further includes a third transducing means spaced apart from the first and second transducing means to define three bidirectional signal propagation paths; and
   wherein steps (a), (b), (c) and (d) are performed in connection with the pair of said transducing means determining each bidirectional path, thereby to generate six composite propagation times T.

5. The process of claim 4 further including the following steps:
   computing a fluid velocity value V for each bidirectional path according to the equation $$V = K/T_1 - K/T_2$$

where K is a constant based on the distance between the transducing means defining the associated bidirectional path, $T_1$ is the composite propagation time in said first direction, $T_2$ is the composite propagation time in said second direction, and each value V is a vector in the direction of its associated propagation path; and
   combining the vectors V of all paths in a single resultant vector representing fluid velocity and flow direction.

6. A signal processing apparatus for a fluid velocity measuring system, including:
   a plurality of electroacoustic transducing means mounted in spaced apart relation to one another within a fluid flow, said transducing means cooperating to define a set of linear bidirectional acoustic signal propagation paths comprised of one of said propagation paths between each pair of the transducing means;
   a first signal generating means for generating a first electrical signal in the form a continuous wave;
   a second signal generating means for generating a second electrical signal in the form of a an individual pulse;
   a coupling means for selectively electrically coupling the first signal generating means and the second signal generating means with the transducing means to cause the transducing means to generate a continuous wave acoustic signal in response to receiving the first electrical signal and, alternatively, to generate an acoustic pulse in response to receiving the second electrical signal; wherein each the transducing means, in response to receiving the acoustic continuous wave signal and the acoustic pulse, respectively generates a third electrical signal in the form of a continuous wave and a fourth electrical signal in the form of an individual pulse;
   a detecting means coupled to the transducing means and to the first and second pulse generating means, for sensing the first, second, third and fourth electrical signals;
   a counting means coupled to the detecting means for generating a plurality of values with respect to each of the propagation paths, including first and second values representing acoustic signal propagation times along the associated path in first and second opposite directions, and third and fourth values representing propagation time of the pulse in the first and second directions; and
   a computing means coupled to the counting means for calculating, with respect to each propagation path, a composite signal propagation time in said first direction based upon the first and third values, and a composite signal propagation time in the second direction based upon said second and fourth values.

7. The signal processing apparatus of claim 6 wherein:
   the first signal generating means comprises a continuous wave generator and the second signal generating means comprises a pulse generator.

8. The signal processing apparatus of claim 7 wherein:
   the coupling means includes a first multiplexing means connected to the continuous wave generator and to the pulse generator and operative to provide an output including, alternatively, the first electrical signal and the second electrical signal; a second multiplexing means connected to receive the output of the first multiplexing means, connected to the transducing means, and operable to provide the first multiplexing means output to a selected one of the transducing means; a first sequencing means for controlling the first multiplexing means to switch said output between the first and second electrical signals; and a second sequencing means for controlling the second multiplexing means to sequentially provide its output to each of the transducing means individually and exclusively.

9. The signal processing apparatus of claim 8 further including:
   a third multiplexing means coupled to the transducing means and operable to receive the third electrical signal and the fourth electrical signal from the transducing means, a third sequencing means for selectively coupling the transducing means individually and exclusively to the third multiplexing means, said third multiplexing means providing its output to the detecting means.

10. The signal processing means of claim 8 further including:

memory means coupled to the counting means for storing the first, second, third and fourth values with respect to each of the propagation paths.

11. The signal processing apparatus of claim 6 wherein:

the detecting means includes a zero crossing detection circuit for sensing the first and third electrical signals and a level detecting circuit for sensing the second and fourth electrical signals.

12. The signal processing apparatus of claim 6 further including:

an oscillating means for generating clocking signals to synchronize the counting means and the computing means.

13. The signal processing means of claim 6 further including:

a sequencing means for controlling said coupling means to provide alternatively one of the first and second electrical signals only to a selected one of the transducing means with the remaining transducing means receiving the acoustic signal generated by the selected transducing means, said sequencing means controllably switching the coupling means to vary the selected transducing means.

14. The signal processing apparatus of claim 6 wherein:

the electroacoustic transducing means comprise ultrasonic transducers, each ultrasonic transducer including a housing, a heating element mounted to an inside wall of the housing, and a temperature sensing element mounted to the inside wall and actuating the heating element responsive to sensing temperatures conducive to ice and snow accumulation.

15. In a fluid flow measurement system including at least three spaced apart electroacoustic transducers defining a plurality of linear, co-planar and bidirectional acoustic signal propagation paths in at least three non-parallel directions between adjacent pairs of the transducers, a process for measuring fluid flow velocity and direction in the plane of the signal propagation paths, including the steps of:

causing each one of the transducers to generate acoustic signals and alternatively to receive acoustic signals generated by at least one of the other transducers;

determining respective signal propagation times corresponding to propagation of the acoustic signals in first and second opposite directions along each of the propagation paths;

computing a fluid velocity value V along each of the signal propagation paths, each value V being a vector in the direction of its associated signal propagation path and computed based on the signal propagation times in the first and second directions along the associated path;

determining whether any of the vectors V is at least substantially aligned with the direction of fluid flow, to identify each of the vectors V as either so aligned or non-aligned; and combining only the non-aligned vectors V to provide a single resultant vector representing fluid flow velocity and direction.

16. The process of claim 15 wherein:

said transducers cooperate to define three of said single propagation paths, each path inclined at an angle of about 60° from the other two paths; and wherein the step of determining whether any of the vectors V is substantially aligned, includes the following substeps:

(i) determining whether all three vectors V have a non-zero magnitude;

(ii) responsive to finding that all vectors V have a non-zero magnitude, so combining only the two vectors having the same polarity; and (iii) alternatively, responsive to determining that one of the vectors V has a zero magnitude, combining the two vectors having a non-zero magnitude.

17. The process of claim 16 wherein:

the acoustic signal propagation paths cooperate to define an equilateral triangle, with vectors in one direction of alternative clockwise and counterclockwise directions around the triangle having a positive magnitude, and the vectors in the other of said directions having a negative magnitude.

18. The process of claim 17 wherein the step of determining signal propagation times includes the following substeps:

(i) with respect to each of the paths, determining respective continuous wave signal propagation times along the path in the first and second directions;

(ii) with respect to each path, determining respective single pulse propagation times along the path in the first and second directions, and determining a single pulse time differential based on the difference in the respective single pulse propagation times; and (iii) determining a composite propagation time value based upon a combination of the continuous wave and single pulse time differentials.

* * * * *